March 19, 1935.  W. J. ST. ONGE  1,994,837
BICYCLE CONSTRUCTION
Filed Jan. 25, 1934  2 Sheets-Sheet 1
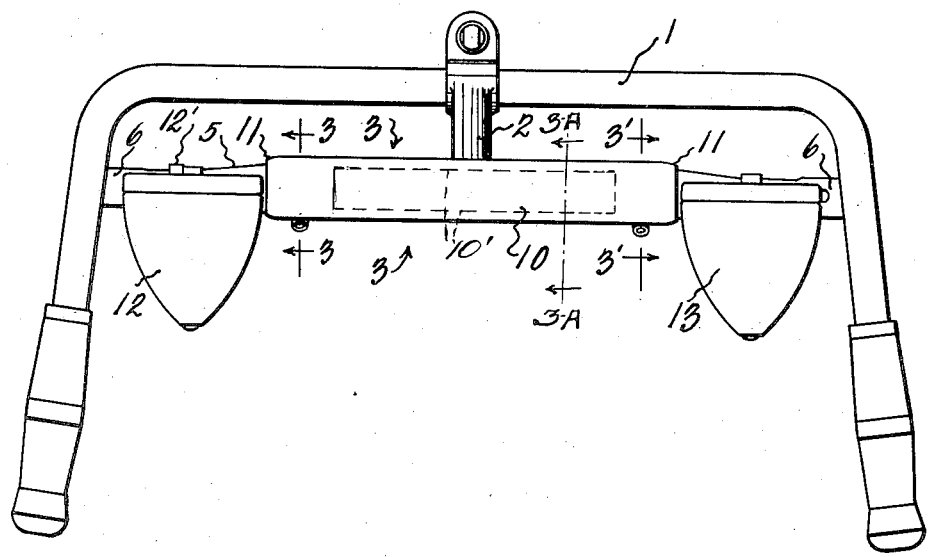
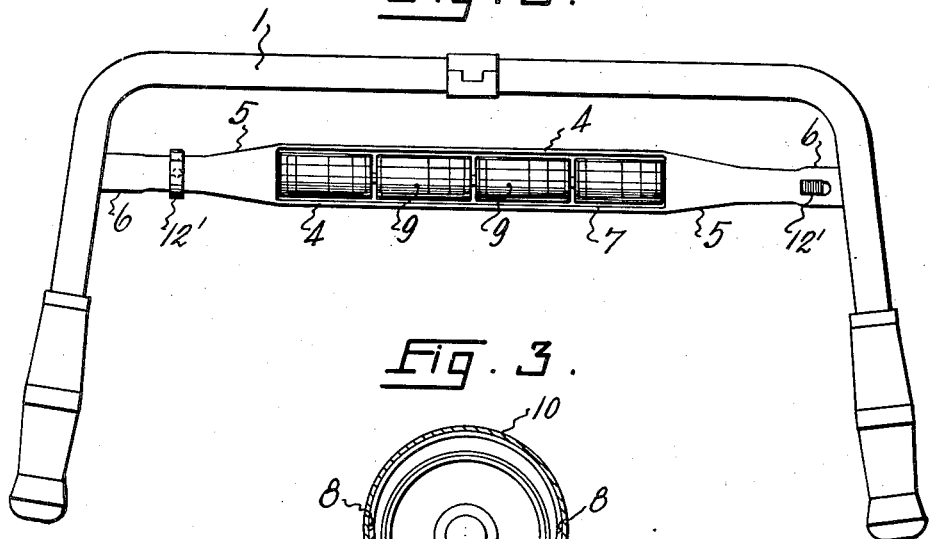
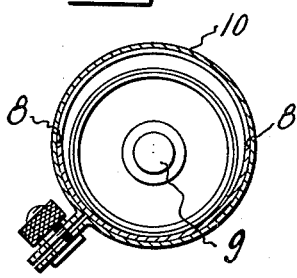
INVENTOR
WALTER J. ST. ONGE
BY Chapin & Neal
ATTORNEYS

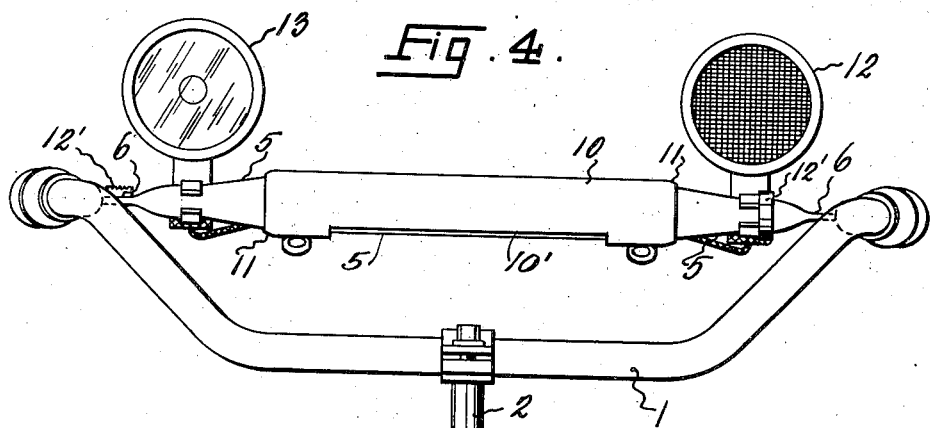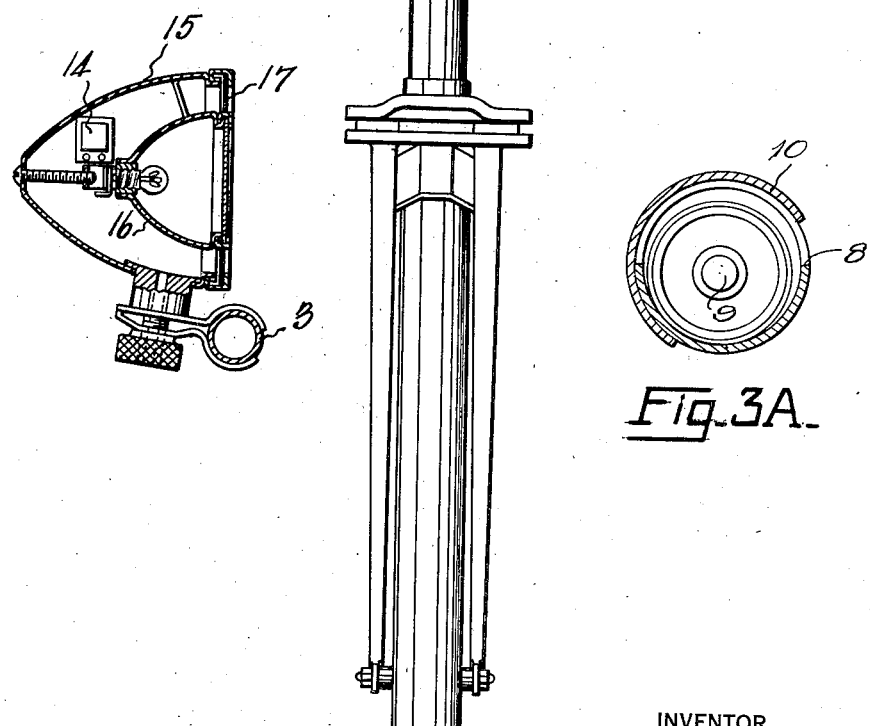

Patented Mar. 19, 1935

1,994,837

UNITED STATES PATENT OFFICE 1,994,837

BICYCLE CONSTRUCTION

Walter J. St. Onge, Torrington, Conn., assignor to The Westfield Manufacturing Company, Westfield, Mass., a corporation of Massachusetts Application January 25, 1934, Serial No. 708,219

4 Claims. (Cl. 208—127)

This invention relates to an improved bicycle construction and particularly to improved devices for carrying accessories on the bicycle.

According to the preferred and what I consider the most useful embodiment of my invention, I employ the tubular crossbar or brace of the handlebar to carry an electric lamp and horn; I place dry cells inside the crossbar very close to the instruments they operate; and I place the switch on the crossbar. In this arrangement the crossbar alone carries all the accessories mentioned and without dependence of any kind on any other part of the handlebar or bicycle construction. There are many advantages in such a bicycle construction as compared to the prior art, as I will point out in connection with the drawings and their detailed description.

The preferred embodiment of my invention discloses certain new and useful features of construction that can be used in various sub-combinations less than the whole. These variations will be pointed out in the description and claims.

Referring to the drawings:

Fig. 1 is a plan view of the bicycle handlebar construction showing the preferred positions of a lamp and horn with the tubular crossbar of the handlebar construction for holding the dry cells, all as the combination will appear to the bicycle rider;

Fig. 2 is a similar view with the handlebar post, lamp, horn, and the cover on the crossbar removed, with the dry cells showing in the crossbar;

Fig. 3 is a section on either line 3—3 or line 3'—3' of Fig. 1;

Fig. 3—A is a detail sectional view on the line 3A—3A of Fig. 1 showing parts of Fig. 3, with the door in partly open position;

Fig. 4 is a front view of my handlebar construction showing a part of the bicycle; and Fig. 5 is a cross-section through a special form of combined lamp and horn construction that may be used for either or both of the electrically operated instruments on the handlebar.

The handlebar 1 is shown with its post 2, and is of the kind having a crossbar or brace, the latter being generally designated 3. The improved form of crossbar is shown in its preferred shape. This is of tubular shape over the greater part of its length, slightly larger in diameter than the tubular stock of the ordinary bicycle handle 1. The idea is to have the cross brace of the handlebar small enough in size to retain the suggestion of its primary and original function as a handlebar brace. From the slightly enlarged portion 4, the tubular shape is gradually reduced adjacent each end at 5, and finally flattened out at ends 6 (see Fig. 4) and permanently joined to the side portions of the handlebar 1. Of course the cross bar may be shaped and joined to the handlebar in other ways within the limits of my invention.

In the enlarged portion 4 I cut out an elongated opening 7, the edges of which show at 8 (Fig. 3). This opening exposes substantially the whole interior space of enlarged portion 4. In Fig. 2 this tubular space is shown filled with a series of dry cells 9 electrically connected in end-to-end relation. It is apparent that with the opening 7 I can insert, inspect, and renew the dry cells in a most convenient manner.

To close this large panel opening 7 I provide a curved cover 10. It is of a size to overlap the opening at the edges and to embrace the portion 4 over a little more than half its circumference. The cover is removably clamped to portion 4 by a pair of strap clamps (as shown in Fig. 3). These are tightened enough to frictionally engage cover 10 on portion 4 so as to hold the cover in place. By slightly loosening the clamps, the cover can be rotated on the axis of the crossbar to expose or cover opening 7. I hold the cover against endwise movement by curving its end portions 11 down into contacting positions with reduced portions 5, whereby a shoulder engagement is had at each end.

This construction of the crossbar or brace to serve as a battery box on the handlebar makes a particularly convenient arrangement. As shown, the batteries are symmetrically arranged, their weight is distributed equally on each side of the steering post, the ordinary use of the crossbar is not interferred with in any way. I have shown the crossbar storage capacity filled with dry cells. I contemplate using such space for other purposes, as the bicycle rider finds convenient from time to time.

In combination with the cross bar constructed for additional use as a battery box, I mount on the crossbar a horn 12 and light 13. As shown in Figs. 1 and 4, these instruments have identical casings and are symmetrically arranged in very close proximity to the battery box portion 4 of the crossbar 3. A convenient manner of clamping these instruments on the crossbar 3 is indicated in Fig. 5. By the arrangement shown, the horn and light give a particularly smart appearance to the bicycle, as best shown in Fig. 4. A very small length of wiring is necessary between dry cells and the electrically operated instruments. I have not shown any wiring diagram, as it is perfectly clear that the switches 12', conveniently located on the crossbar near the ends, may be connected and wired to dry cells and instruments for the desired operation.

If it is desired for simplification to have only one casing on the handlebar, the horn and lamp may be unit in a single casing 15, as shown in Fig. 5. In such a construction the sound will travel from buzzer (diagrammatically shown at 14), around the annular space surrounding the interiorly arranged lamp reflector 16, and through the screened opening 17.

Two instruments like that shown in Fig. 5 may be mounted on the crossbar, as the two are shown in Fig. 4. By making the horns with different notes and wiring for simultaneous or successive operations, various effects can be produced. This will illustrate the variety of arrangements which can be made on the improved handlebar construction and yet keep the whole appearance simple and artistically neat, as well as mechanically free of trouble in mounting accessories on a bicycle. An illustration of this simplicity is in the fact that one can make up the bicycle at the factory complete in every way and without either horn or lamp and without a crossbar on the handlebar. Then, by merely adding my improved crossbar with its accessories, all in one assembly unit, the bicycle is provided with handlebar, cross brace, dry batteries, lamps, horns, and switches. So far as I am aware, this mechanical convenience of arrangement, simplicity in bicycle construction, and advantage in design have never before been conceived. It is a characteristic of my invention in its preferred form that the handlebar cross brace or bar (which is a common accessory for the handlebar for improving its appearance and giving a variety for the rider's position in steering) carries the complete electrical equipment for lamp or horn or both, and at the same time gives an improved or smart appearance to the bicycle. While this characteristic is important, of carrying the complete equipment in combination with the crossbar, it is of course apparent that in particular instances the lamp or horn or switch may be desired on other parts of the bicycle or on the handlebar. I do not wish to limit myself to the exact position of the parts shown.

It may be desirable to have a single lamp (or a single lamp and horn casing, as shown in Fig. 5) mounted centrally in the main plane of the bicycle. This can be most conveniently arranged by clamping the instrument at the middle of the crossbar. This would mean unclamping it to get at the battery compartment. But such an arrangement of horn and lamp in a single casing mounted centrally on the crossbar directly over the hidden batteries would give a particularly smart and simple appearance to the bicycle while supplying it with an electric horn, lamp, and batteries.

In addition to the advantage to the bicycle rider in my improved construction, there is considerable advantage to the bicycle manufacturer. The latter can by a simple change in the crossbar of the handle provide for storing the dry cells, attaching the switches, the horn, the lamp, and the wiring without touching any other part of the bicycle or changing any other part of the bicycle to provide for these things. The result is that the manufacturer can deliver his assembled product in simpler and better form. And the handlebar assembly embodying my invention is applicable to the standard form of bicycle frame, whether made with the plan of using this invention or of using the common form of handlebar. This economy of putting the invention into practice is important from the manufacturer's viewpoint.

The particular arrangement of the invention illustrated has an advantage in protecting the electrical equipment from the normal risks in bicycle use. This will be appreciated if one considers the number of times that a boy's bicycle is thrown or falls over into all sorts of positions. When this happens with my assembly the handlebar proper holds the lamp and horn and battery away from direct contact with the ground. This will be seen from the fact that in practically all positions of a falling bicycle the handlebar must hit the ground. My electric assembly is all on the brace between the side portions of the handlebar and in back of the front portion. About the only way that such assembly could bang on the ground is to have the bicycle first turned upside down and then dropped vertically. Such a fall does not happen accidentally.

I mention these things because, while the invention is quite simple in final appearance, its conception has resulted from long experience and close consideration of how to improve the accessory problem in bicycle manufacture, use, and appearance.

I claim:—

1. In a bicycle construction having a handlebar and stem both of the customary kind such as are adapted to be assembled and disassembled by sliding the bar through the usual split collar at the top of the stem, the combination with such a handlebar and stem of a crossbar mounted between the sides of the handlebar forwardly of the handlebar grips, the ends of said crossbar immediately adjacent their joints with the handlebar being of reduced size and small enough to slide with the handlebar past the split collar at the top of the handlebar stem, said crossbar between such ends being enlarged in tubular form greater than the diameter of the handlebar, said enlarged tubular portion having a door for access to its interior, all constructed and arranged for using the crossbar as a battery box with the customary handlebar and handlebar stem and without interfering in any way with the normal functional purposes or appearance of the handlebar and stem as they have been customarily made.

2. In a bicycle construction, a handlebar stem having a split collar at the top, a handlebar of tubular stock to slide through said collar for assembly with the collar around the middle of the handlebar, a battery box supporting joint near each end of the handlebar forwardly of its grips, a battery box of general tubular form mounted as a crossbar between said joints, the support for said battery box construction adjacent said joints being small enough to slide past said collar with the handlebar and pass through the split in the collar, all constructed and arranged for the battery box to go on the handlebar as a crossbar without interfering with the desired construction of the handlebar and its stem.

3. In a bicycle construction, a handlebar of tubular stock, an elongated battery box formed independently of the handlebar and mounted on the latter to serve as a crossbar between its side portions forwardly of its hand grips, attaching means to connect the ends of the battery box with the handlebar stock, said attaching means being located entirely within the top and bottom sides of the handlebar stock at the ends of the battery box and being small relatively to the size of the handlebar stock.

4. In a bicycle construction, a handlebar of tubular stock, an elongated container for accessories such as dry batteries, said container having the general form of a tube and long enough to span the length between the side portions of the handlebar thereby serving both for an accessory container and for a hand grip crossbar on the handlebar, the end portions of said container being narrowed down and connected to the side portions of the handlebar, the joints between the handlebar and the ends of the container being smaller in cross-section than the container in its intermediate sections so as to join the parts and avoid objectionable enlargements on or immediately adjacent the handlebar stock.

WALTER J. ST. ONGE.